US008150673B1

(12) United States Patent
Tocci et al.

(10) Patent No.: US 8,150,673 B1
(45) Date of Patent: *Apr. 3, 2012

(54) PARTITIONING A MODEL IN MODELING ENVIRONMENTS

(75) Inventors: Michael David Tocci, Shrewbury, MA (US); Ricardo Monteiro, West Roxbury, MA (US); Mojdeh Shakeri, Southborough, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1214 days.

This patent is subject to a terminal disclaimer.

(21) Appl. No.: 11/825,371

(22) Filed: Jul. 5, 2007

Related U.S. Application Data

(62) Division of application No. 10/887,960, filed on Jul. 8, 2004, now Pat. No. 7,487,080.

(51) Int. Cl.
*G06F 9/45* (2006.01)
(52) U.S. Cl. .................................................. 703/22
(58) Field of Classification Search ................ 703/22
See application file for complete search history.

(56) References Cited

U.S. PATENT DOCUMENTS

| | | | |
|---|---|---|---|
| 5,872,958 A | 2/1999 | Worthington et al. | |
| 6,854,113 B1 * | 2/2005 | Sankar et al. | 718/1 |
| 7,120,896 B2 | 10/2006 | Budhiraja et al. | |
| 7,210,122 B2 * | 4/2007 | Shuf et al. | 717/116 |
| 7,487,080 B1 * | 2/2009 | Tocci et al. | 703/22 |
| 2002/0144256 A1 | 10/2002 | Budhiraja et al. | |
| 2003/0140126 A1 | 7/2003 | Budhiraja et al. | |

OTHER PUBLICATIONS

El-Rewini, Hesham, Proceedings of the Thirtieth Hawaii International Conference on System Sciences, vol. 1, pp. 1-12 (1997).
Hartley, C.L. et al., "Concurrent Programming with Shared Objects in Networked Environments," Proceedings of the 7th Intl. Parallel Processing Symposium, pp. 471-478 (1993).

* cited by examiner

*Primary Examiner* — Hugh Jones
(74) *Attorney, Agent, or Firm* — Nelson Mullins Riley & Scarborough LLP

(57) ABSTRACT

Methods and systems for partitioning objects in modeling environments are disclosed. The modeling environments enable users to partition an object (parent object) to include other objects (child objects). The parent object may reference the child objects (referenced objects). The child objects may be subsystems in the hierarchy of the parent object or modules (or units) in the partitioning of the parent object. The child objects may be encapsulated so that changes in the parent object do not affect the child objects. The partition of the parent object may allow users to load and compile the parent object incrementally. The partition of the parent object may also allow users to generate code for the parent object incrementally.

20 Claims, 12 Drawing Sheets

PARTITIONING A MODEL IN MODELING ENVIRONMENTS

RELATED APPLICATIONS

This application is a divisional of U.S. patent application Ser. No. 10/887,960, filed Jul. 8, 2004, the contents of which are hereby incorporated by reference.

FIELD OF THE INVENTION

The present invention relates generally to modeling environments and more particularly to methods and systems for partitioning models in the modeling environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., dataflow diagrams, and software diagrams, such as those found in the Unified Modeling Language.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

In designing models of modern systems, the size of the models is being increased to a stunning level of complexity. Hundreds of thousands of components may be included in the models. In order to manage the complexity of the models, the technologies of hierarchy, abstraction, and partitioning are utilized. The hierarchy is typically captured by so-called 'subsystems.' Because subsystems may contain their own subsystems, they provide a mechanism for the hierarchical structure of the models. Abstraction allows dismissing system behavior in the models if it is not important to the problem that needs to be addressed and for which the models are designed. Including arbitrary detail often complicates and hampers the design, analysis, and/or synthesis of the model. Partitioning is used to create separate and independent modules (or 'units') in the models. The partitioning facilitates engineers to work on engineering projects where each engineer (or a group of engineers) is responsible for one unit of the models. The aforementioned technologies may help design models that have a high level of complexity.

SUMMARY OF THE INVENTION

The present invention provides methods and systems for partitioning an object (parent object) to include other objects (child objects) in modeling environments. In an illustrative example of partitioning an object, the parent object may reference the child objects in modeling environments. The referenced objects may include modules or units in the partitioning of the parent object that can be referenced from anywhere in the hierarchy of the parent object. In another illustrative example of partitioning an object, the child objects may include subsystems that implement modules or units of the parent object.

The present invention may provide information on the interface of the child objects separately from information on the content of the child objects. The information on the interface of the child objects may be used to design the parent object. The information on the content of the child objects may be provided in an illegible format, such as a binary format and an encrypted format, so that users cannot obtain information on the content of the child objects and thus, provide a degree of intellectual property protection. Therefore, information on the content of the child objects is protected from being disclosed to the users.

The present invention may encapsulate the partitioned portion of the object. For example, the present invention may encapsulate child objects. The encapsulated child objects behave independently of the context of the parent object. That is, the behavior of the child objects in the context of the parent object is the same as the behavior of the child objects when the child objects are executed by themselves. In the encapsulation of the child objects, the implementation details of the child objects may be kept private from the parent object as long as the interface of the child objects does not change. If any changes in the compiled properties of a child object affect the interface of the referenced object, then the parent object will be changed. For instance, if a child object is changed to output a different data type, then the parent objects may be changed to be able to handle the changes to the child object. Thus, the changes in the child object may affect the parent object itself, but do not affect other child objects of the parent object.

The present invention may provide an incremental approach for recompiling an object that is partitioned into a plurality of portions, such as child objects. If changes are made in a child object, components affected by the changes are recompiled to re-derive the characteristics of the components in the object. If changes in a child object do not change the properties of its interface characteristics, characteristic for any components connected to the child object need not be re-derived.

Likewise, if changes are made in the child object, code for the child object needs to be regenerated to reflect the changes in the child object. Code for other child objects of the parent model, however, does not need to be regenerated because the changes in the child object do not affect other child objects of the parent model. Thus, the present invention may provide a more efficient approach to incrementally update code for the parent model. Code for the other child objects need not be updated unless they have changes. The regenerated code for the child objects is compiled and linked with the code for the parent model to execute the parent model.

In accordance with one aspect of the present invention, a method is provided for partitioning objects in modeling environments. A first object is provided with components, wherein the first object is partitioned to include a second object. The second object contains information on the interface of the second object. When loading the first object, the information on the interface of the second object is loaded separately from the information on the content of the second object.

In another aspect of the present invention, a method is provided for partitioning objects. A first object is provided with components, wherein the first object is partitioned to include a second object. The second object is encapsulated so that changes in the first object do not affect the second object. The changes in the second object may affect the first object, but other child objects of the first object are not affected by the changes in the second object.

In still another aspect of the present invention, a method is provided for recompiling an object in the modeling environment is provided. A first object with components wherein the first object is partitioned to include a second object and the second object includes an interface. When there are changes in the second object, the second object is recompiled to determine properties of components in the second object. It is determined whether the interface of the second object is affected by the changes in the second object, and the first object is recompiled based on the determination.

In still another aspect of the present invention, a method is provided for generating code for an object in modeling environments. A first object is provided with components, wherein the first object is partitioned to include a second object. Code for the first object is generated. When there are changes in the second object, code for the second object is regenerated. Code for the second object is linked with the code for the first object to execute the first object.

In yet still another aspect of the present invention, a method is provided for executing an object that includes components, one of the components referencing a second object. A first set of the components are selected to be executed in a first execution mode. A second set of the components is selected to be executed in a second execution mode. The object is executed in a mixed execution mode in which the first set of the components is executed in the first execution mode and the second set of the components are executed in the second execution mode. Or the object itself may be executed in a different execution mode than the first execution mode and/or the second execution mode By partitioning objects, the present invention enables users to reduce the complexity of an object in designing the object in modeling environments. The present invention also provides an incremental loading, compilation and code generation of the object. The incremental loading, compilation and code generation of the present invention improves time for loading, compiling and generating code of the object.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
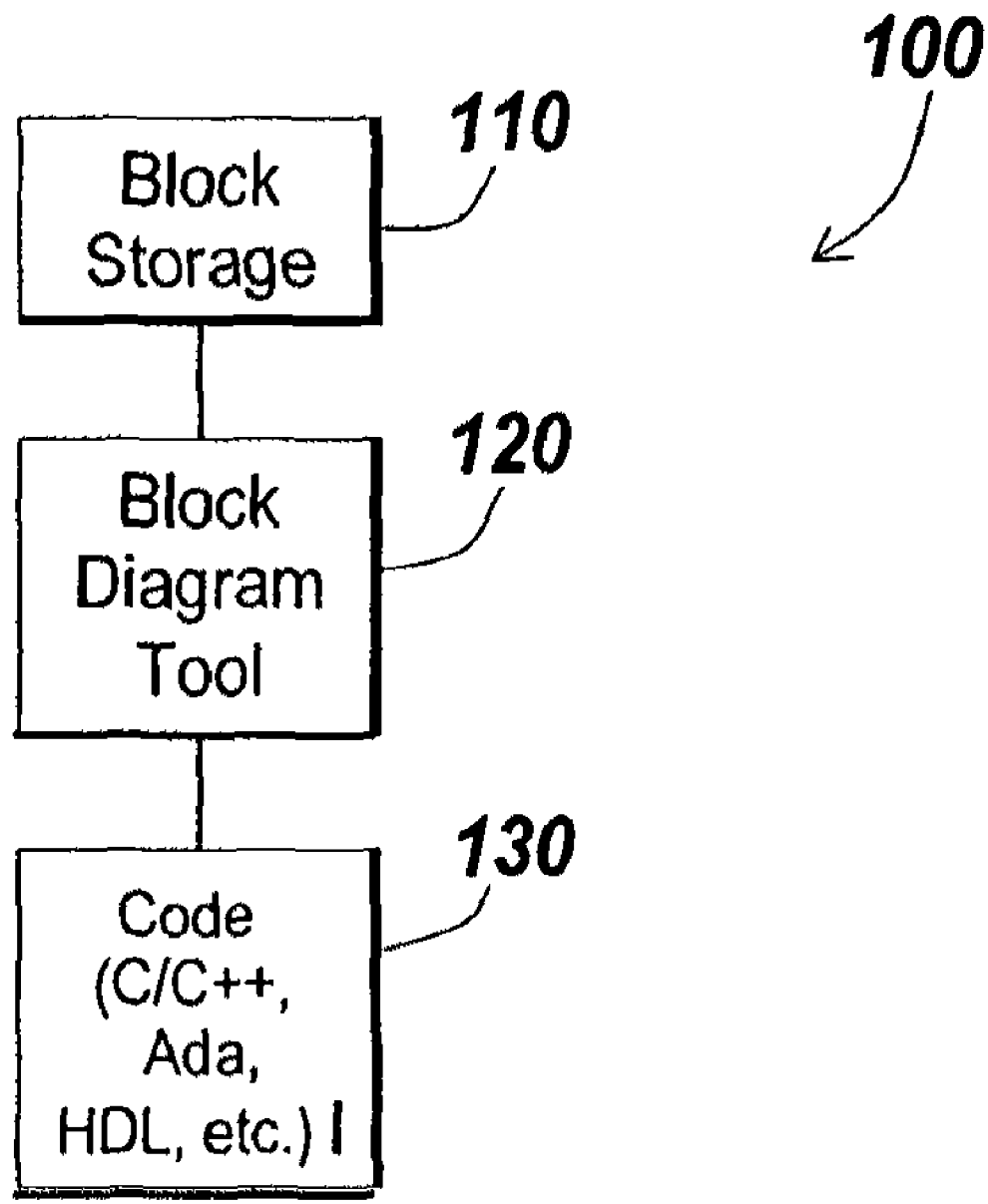
FIG. 1 is an exemplary block diagram modeling environment in which blocks are used to represent components of models in the illustrative embodiment of the present invention.

The illustrative embodiment of the present invention concerns partitioning of block diagram models, in modeling environments, such as time-based block diagram modeling environments. One of skill in the art will appreciate that the block diagram modeling environments are illustrative graphical modeling environments and the present invention may apply to other types of modeling environments including textual command line modeling environments and other graphical modeling environments, such as state-based and flow diagram modeling environments, Unified Modeling Language modeling environments and data flow diagram modeling environments.

The illustrative embodiment of the present invention enables users to partition a model (parent model) by referencing other models (referenced models). One of ordinary skill in the art will appreciate that the model references are illustrative embodiments of the present invention and the present invention may be implemented using other partitioning technologies, such as using the subsystems of the model.

In the illustrative embodiment, the referenced models contain information on the interfaces and contents of the referenced models. When loading the parent model, only the information on the interfaces of the referenced model is loaded. The information on the interfaces of the referenced models is used to design the block diagram of the parent model. In particular, the information on the contents of the referenced models may be provided in an illegible format, such as a binary format and an encrypted format, so that the information can be used in the execution of the parent model. Users, however, cannot read the information on the content of the referenced models, and therefore, the information on the content of the referenced models can be protected from being disclosed to the users.

The illustrative embodiment of the present invention encapsulates the referenced models. In the encapsulation of the referenced models, changes in referenced models may affect blocks in the parent model, but changes in the parent model will not affect the referenced models.

The illustrative embodiment of the present invention also provides an incremental approach for recompiling models and generating code for the models. When a change is made in a portion of the model, the illustrative embodiment only re-derives the characteristics for blocks that require them to be changed. The encapsulation of the referenced model forms a natural boundary for the effect that model changes may have. Certain changes within the referenced models cannot change the property of its interface characteristics, and, therefore, they do not need to be re-derived for any blocks connected to the referenced model. If changes are made in a referenced model and code for the referenced model is not updated after the changes, code for the referenced model is regenerated to reflect the changes in the referenced model. Code for other referenced models of the parent model, however, does not need to be regenerated because the changes in the referenced model do not affect other referenced models in the parent model. In some instances, code for the parent model may not be rebuilt because certain attributes of the parent model are allowed to propagate through the referenced model. For example, the referenced model may accept an input that is a vector of variable length and code for the referenced model is generated to be flexible enough to accept vectors of any length. This way, a change to the parent model which causes the width of the input vector to the referenced model to change will not cause a rebuild of the referenced model. The regenerated code for the referenced models may be compiled and linked with the code for the parent model to execute the parent model.

The illustrative embodiment of the present invention also enables users to easily set up an execution mode for executing a model. The execution mode may include an interpretive execution mode and an accelerated execution mode. The illustrative embodiment of the present invention provides a mixed execution mode in which some of the components are executed in the interpretive execution mode and some of the components are executed in the accelerated mode. In particular, the illustrative embodiment of the present invention enables the users to easily set up the mixed execution mode by selecting components that are to be executed in the accelerated execution mode. The selected components are compiled before the execution begins. In other embodiments, the mixed mode may include a fixed step execution mode and a variable step execution mode.

FIG. 1 is an exemplary block diagram modeling environment 100 in which blocks are used to represent the components of models in the illustrative embodiment of the present invention. The modeling environment 100 includes a block storage 110 and a block diagram tool 120. The block diagram tool 120 may generate C-code 130 for the models in the illustrative embodiment of the present invention. The block storage 110 contains application specific blocks that support the design of models. The blocks in the block storage 110 are incorporated into the block diagrams of the models designed in the block diagram tool 120. One of skill in the art will appreciate that the blocks in the block storage 110 can be represented in various kinds of graphical symbols or textual symbols. An illustrative embodiment of the block storage 110 may be found in Simulink Blocksets, such as the Aerospace Blockset and the Signal Processing Blockset, from The MathWorks, Inc. of Natick, Mass. The Blocksets provide utilities for the development and integration of models for systems and sub-systems of the systems. The block storage 110 may include native Simulink® blocks or S-functions defined by users to be operated in the Simulink® environment. S-functions written in C-code, for example, are compiled using the MEX command in MATLAB® to make a file that is executable in the Simulink® environment.

The block diagram tool 120 provides graphical environments for designing, executing, and analyzing models. The block diagram tool 120 incorporates the blocks provided from the block storage 110 into the models. The models may be also executed to analyze the behavior of the models designed in the block diagram tool 120. Exemplary block diagram tool 120 may be found in Simulink®, from The MathWorks, Inc. of Natick, Mass. Simulink® enables users to design a block diagram for a target system, simulate the system's behavior, analyze the performance of the system, and refine the design of the system. Simulink® allows users to design target systems through a user-interface that allows drafting of block diagram models of the target systems. All of the blocks in the block storage 110 are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block storage 110 on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to execute the designed target systems to determine the behavior of the systems. Simulink® includes a block diagram execution engine that carries out the task of compiling and linking the block diagram to produce an "in-memory executable" version of the model that is used for generating code and/or executing a block diagram model.

Modularity may be achieved in a block diagram by layering the block diagram through the use of subsystems. A subsystem facilitates layering by allowing a collection of blocks to be represented by a single block with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram. By nesting subsystems within each other, one can create block diagrams with arbitrary layers of hierarchy. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem. There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

Once a block diagram model has been constructed, model execution is carried out over a user-specified time span for a set of user-specified inputs. The execution begins when the block diagram is compiled. The compile stage marks the start of model execution and involves preparing data structures and evaluating parameters, configuring and propagating block characteristics, determining block connectivity, and performing block reduction and block insertion. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point. During the configuration and propagation of block and port/signal characteristics, the compiled attributes (such as dimensions, data types, complexity, or sample time) of each block (and/or ports) are setup on the basis of the corresponding behaviors and the attributes of blocks (and/or ports) that are connected to the given block through lines. The attribute setup is performed through a process during which block behaviors "ripple through" the block diagram from one block to the next following signal connectivity. This process (referred to herein as "propagation"), serves two purposes. In the case of a block that has explicitly specified its block (or its ports') behaviors, propagation helps ensure that the attributes of this block are compatible with the attributes of the blocks connected to it. If not, an error may be issued. Secondly, in many cases blocks are implemented to be compatible with a wide range of attributes. Such blocks adapt their behavior in accordance with the attributes of the blocks connected to them. This is akin to the concept of polymorphism in object-oriented programming languages. The exact implementation of the block is chosen on the basis of the specific block diagram in which this block finds itself. Included within this step are other aspects such as validating that all rate-transitions within the model yield deterministic results and that the appropriate rate transition blocks are being used. The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process. The way in which blocks are interconnected in the block diagram does not necessarily define the order in which the equations (methods) corresponding to the individual blocks will be solved (executed). The actual order is determined during the sorting step in compilation. Once the compilation step has completed, the sorted order cannot be changed for the entire duration of the block diagram's execution.

Following the compilation stage, code may or may not be generated. If code is generated, the model is simulated/executed through accelerated execution mode in which the block diagram model (or portions of it) is translated into either software modules or hardware descriptions (broadly termed code). If this stage is performed, then the stages that follow use the generated code during the execution of the block diagram. If code is not generated, the block diagram may execute in interpretive mode in which the compiled and linked version of the block diagram may be directly utilized to execute the model over the desired time-span. This interpretive mode of execution is suitable for getting fine-grained signal traceability. There are several different advantages to execution through code generation. Execution of generated code can be more efficient than interpretive execution because of fewer data-structures and lesser internal messaging in the engine, although the increased efficiency generally comes at the cost of decreased execution traceability. Simulation of hardware descriptions during execution can help identify and resolve bugs in the software stage of a design project. Such bugs prove much more expensive to track and fix once the system has been implemented in hardware. Additionally, block diagram modeling software can be integrated with other software environments that are suitable for modeling and executing special classes of systems. Models can be tested directly in hardware thereby making prototyping of new systems fast and cost-effective. Those skilled in the art will recognize that when users generate code, they may choose to not proceed further with the block diagram's execution. They may choose to take the code and deploy it outside of the confines of the modeling software environment.

The block diagram tool 120 may generate customizable C-code 130 directly from the block diagrams of the models designed using the block diagram tool 120. By automatically generating C-code 130, the block diagram tool 120 enables rapid prototyping, hardware-in-the-loop executions, and desktop rapid execution of the models designed in the block diagram tool 120. The block diagram tool 120 may generate efficient C-code 130 for embedded systems applications. One of skill in the art will appreciate that C-code 130 is an illustrative language that is generated in the block diagram tool 120 and the block diagram tool 120 may generate different languages for the models, such as Ada, Basic, FORTRAN and other types of code, such as HDL. Real-Time Workshop from The MathWorks, Inc. of Natick, Mass., is an exemplary code generation tool.

One of skill in the art will also appreciate that the modeling environment 100 is not limited to block diagram environments, but rather includes any other modeling environments, such as textual command line modeling environments and other graphical modeling environments, such as state-based and flow diagram modeling environments. Stateflow® from The MathWorks, Inc. of Natick, Mass., provides an exemplary state-based and flow diagram modeling environment. Stateflow® provides a graphical environment for modeling and designing event-driven models. Stateflow® enables users to generate state-based and flow diagrams that graphically represent hierarchical and parallel states and the event-driven transitions between the states of the models. Simulink® that is seamlessly interfaced with Stateflow® may execute the models and analyze the behavior of the models based on the state-based and flow diagrams created in Stateflow®.

Figure 2:
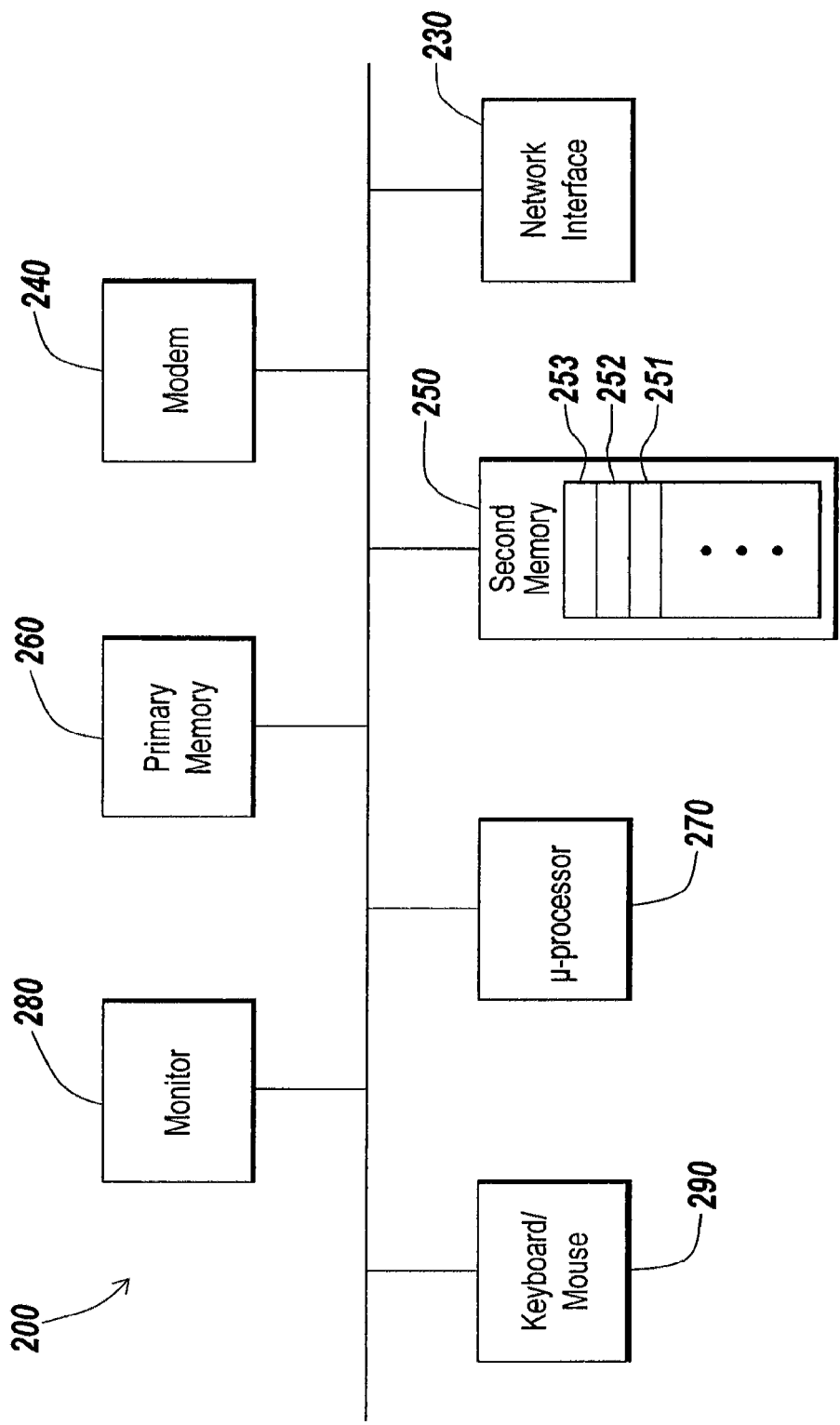
FIG. 2 is a block diagram representation of an electronic device suitable for practicing the illustrative embodiment of the present invention.

FIG. 2 is a block diagram representation of an electronic device 200 suitable for practicing the illustrative embodiment of the present invention. The electronic device 200 includes a secondary memory 250, a primary memory 260, a microprocessor 270, a monitor 280 and a keyboard/mouse 290. The microprocessor 270 controls each component of the electronic device 200 to run the software tools in the modeling environment 100 properly. The electronic device 200 receives the data necessary for the design of models through the keyboard/mouse 290. The electronic device 200 displays in the monitor 280 the data generated in the modeling environment 100 including the block diagram of the models and C-code 130 for the models. The primary (working) memory 260 fetches from the secondary (storage) memory 250 and provides to the microprocessor 270 the code that need to be accessed by the microprocessor 270 to operate the electronic device 200 and to run the modeling environment 100. The secondary memory 250 usually contains software tools for applications. The secondary memory 250 includes, in particular, code 251 for the block storage 110, code 252 for the block diagram tool 120, and code 253 for the model generated by the block diagram tool 120. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network).

Figure 3A:
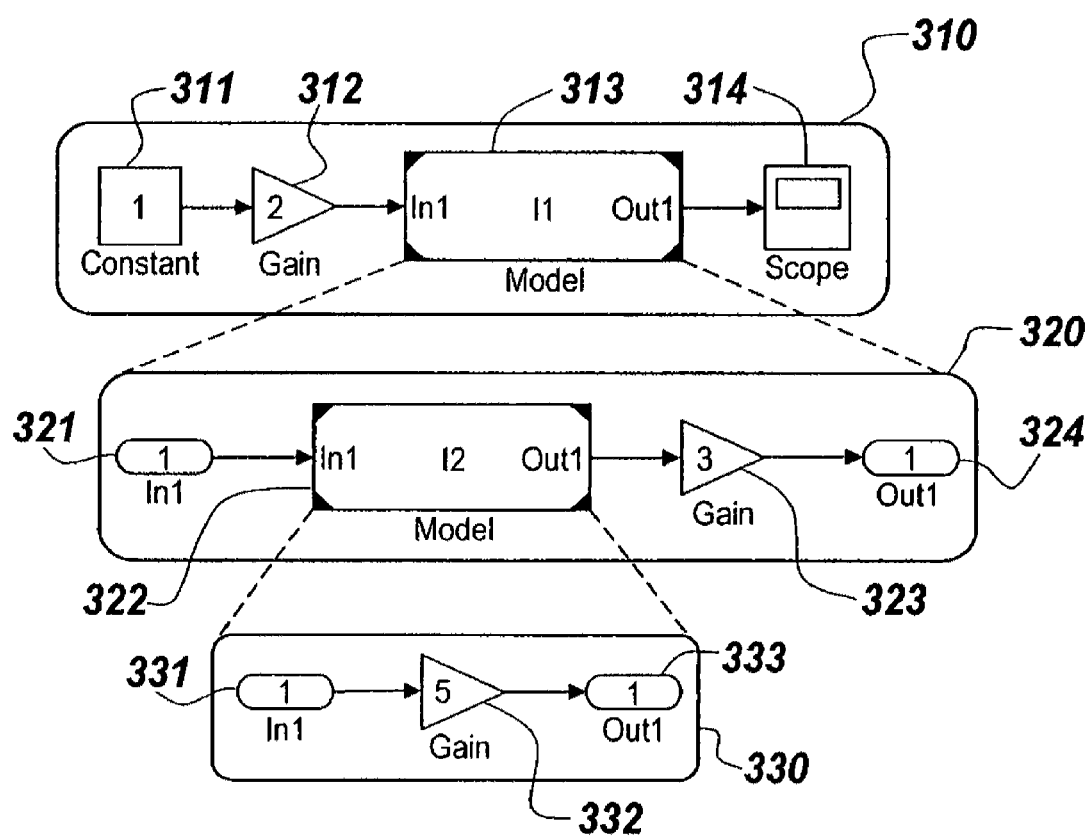
FIG. 3A is an exemplary model designed in the block diagram modeling environment of the illustrative embodiment of the present invention depicted in FIG. 1.
Figure 4A:
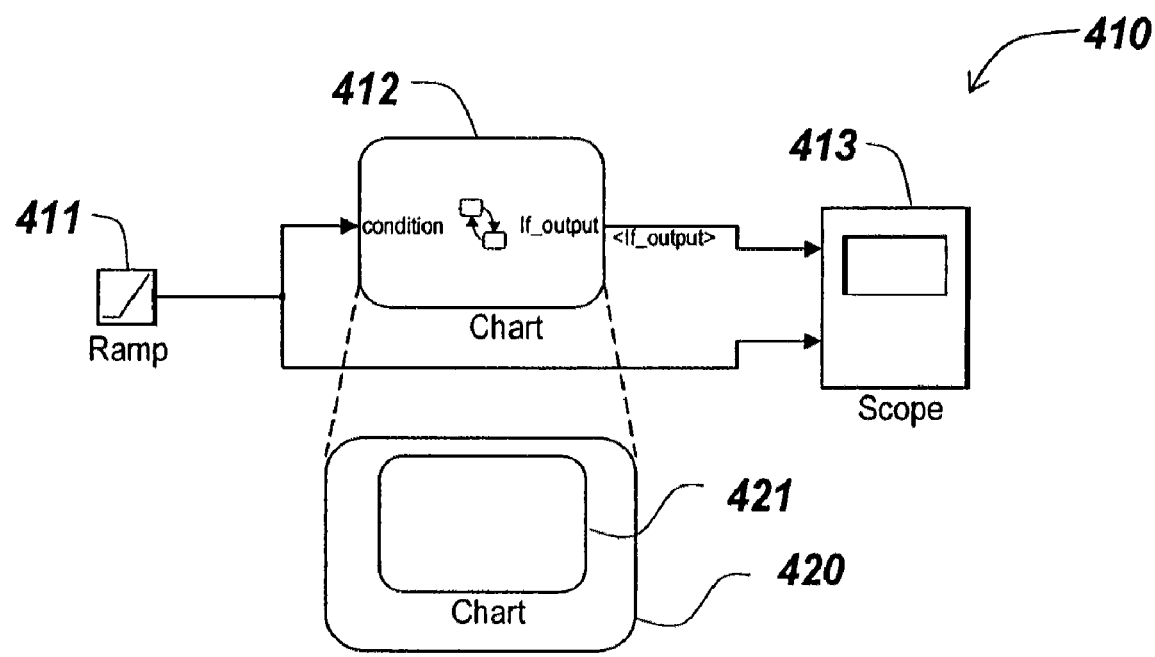
FIGS. 4A and 4B show an exemplary model designed in a state-based and flow diagram modeling environment in the illustrative embodiment of the present invention.
Figure 4B:
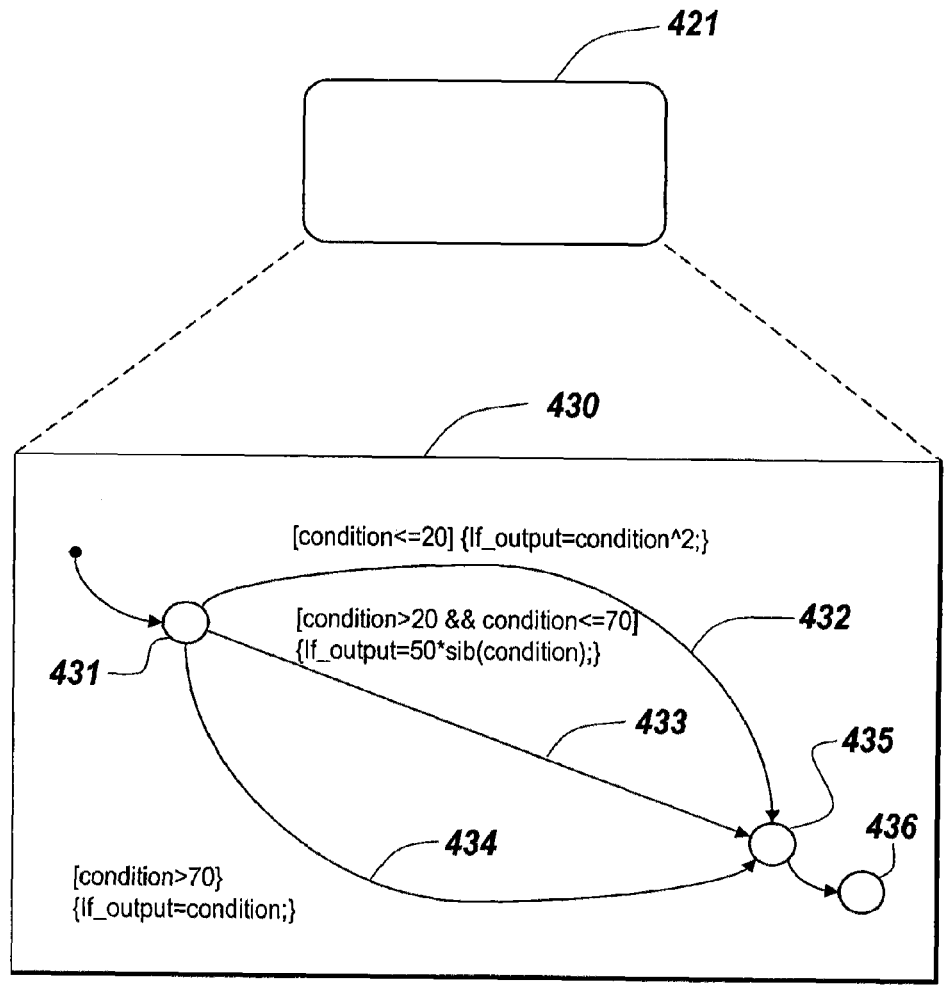

FIGS. 3A, 4A and 4B are exemplary models designed in the modeling environment 100 of the illustrative embodiment of the present invention depicted in FIG. 1. Models 310 and 410 are designed in a time-based block diagram modeling environment and a state-based and flow diagram modeling environment, respectively. One of ordinary skill in the art will appreciate that the present invention may apply to other types of modeling environments including textual command line modeling environments and other graphical modeling environments, such as a data flow modeling environment. As shown in the figures, the models 310 and 410 include a component that references other models, which helps users reduce the complexity of the models 310 and 410. The referenced models 320, 330, 420 and 430 may include subsystems in the hierarchy of the models 310 and 410 and/or modules (or 'units') in the partitioning of the models 310 and 410. Because subsystems may contain subsequent subsystems, they provide a mechanism for the hierarchical structure of the models. Partitioning is used to create separate and independent modules (or 'units') in the models so that it facilitates engineers to work on engineering projects where each engineer (or a group of engineers) is responsible for one unit of the models.

Figure 3B:
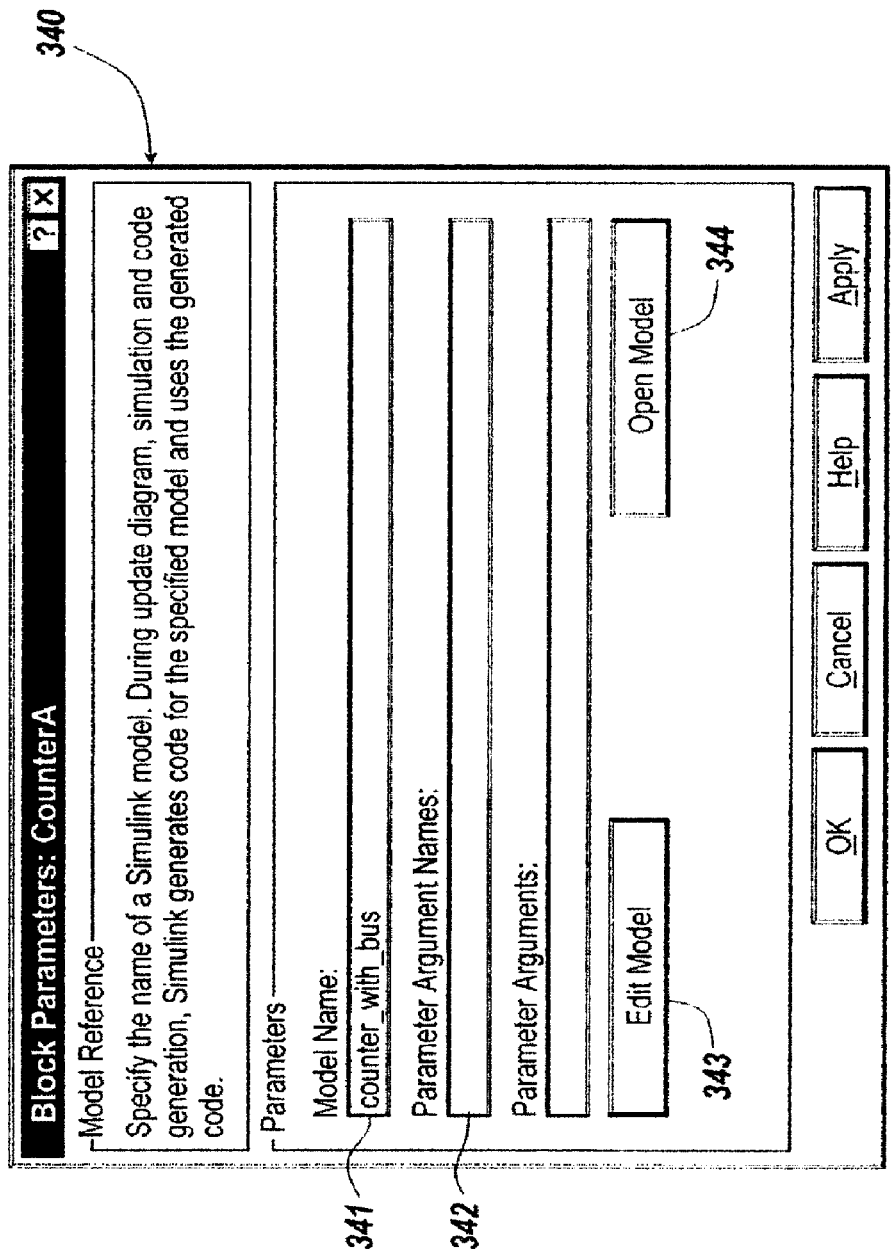
FIG. 3B is an exemplary user interface for specifying models referenced by parent models depicted in FIG. 3A.

With reference to FIG. 3A, the model 310 includes component blocks, such as a Constant block 311, a Gain block 312, a Model block 313 and a Scope block 314. The component blocks 311-314 in the model 310 may be provided by the modeling environment 100 or defined by users. For example, the component blocks 311-314 may be built on native Simulink® blocks or S-functions which enable users to define the blocks that can operate in the Simulink® environment. The component blocks 311-314 may refer to other models. In the illustrative embodiment, the Model block 313 refers to a model 320. The referenced model 320 includes its own component blocks including an In block 321, a Model block 322, a Gain block 323 and an Out block 324. The Model block 322 also refers to another model 330 that includes an In block 331, a Gain block 332 and an Out block 333. FIG. 3B is an exemplary user interface 340 for specifying models that Model block 313 or 322 refers to. The user interface 340 may include a blank 341 for entering a name of the model being referenced. User can change the referenced model name and can edit and open the referenced model by clicking "Edit Model" and "Open Model" buttons 343 and 344. The parameter arguments 342 are part of the interface between a parent model and the model being referenced by the parent model.

With reference to FIGS. 4A and 4B, the model 410 includes a Ramp block 411, a Chart block 412 and a Scope block 430. The Chart block 421 references a model 420 that includes a Chart block 421 as a component of the model 420. The Chart block 421 also references another model 430 the content of which is depicted in FIG. 4B. The model 430 includes connective junctions 431, 435 and 436 that make decisions based on the given condition. Three transitions 432-434 are located between the connective junctions 431 and 435. One of the transitions 432-434 are selected based on the given condition. One of skill in the art will appreciate that the models 310 and 410 may also be referenced by a component block included in a higher level model.

Figure 5:
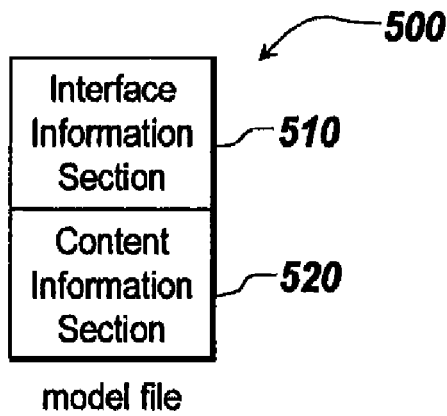
FIG. 5 depicts an exemplary structure of files for the referenced models in the illustrative embodiment of the present invention.

The illustrative embodiment of the present invention provides information on the interface of the referenced models separately from information on the content of the referenced models. FIG. 5 depicts an exemplary structure of files for the referenced models in the illustrative embodiment of the present invention. For example, model file 500 for model 320 contains interface information of the model 320 separately from content information of the model 320. For this purpose, the model file 500 includes an interface information section 510 for storing interface information of the model 320 and a content information section 520 for storing content information of the model 320. The interface information of the model 320 may include the number of input and output ports of the model 320 and the properties of input output signal at the input and output ports of the model 320, such as data type, sample rates and signal dimensions. The content information of the model 320 may include the parameters of the components in the model 320 and the connections between the components in the model 320. In the illustrative embodiment of the present invention, interface information is located on the top of the model file 500 so that interface information can be parsed content information in the model file 500 as quickly as possible. Interface information in the interface information section 510, such as the properties of the interface of the model 320, may be changed by users. One of ordinary skill in the art will appreciate that the interface information can be contained at any location of the model file 500 in other embodiments of the present invention. An exemplary code for the model file 500 is provided as follows.

```
Model {
    Name                    "counter_with_paramargs"
    Version                 6.0
    InterfaceInfo {
        NumRootInputPorts           1
        InputPortName               " input"
        NumRootOutputPorts          1
        OutputPortName              "output"
        ParameterArgumentNames
        "lower_saturation_limit,upper_saturation_limit"
        ComputedModelVersion        "1.89"
        NumTestPointedSignals       0
    }
    ...
```

This is the top of the model file 500 that contains the interface information. The rest of the model file 500 may includes thousands of lines for content information of the model file 500, which may take a long time for loading. Loading only the interface information of the model file 500 is quick and can save a lot of time.

Figure 6A:
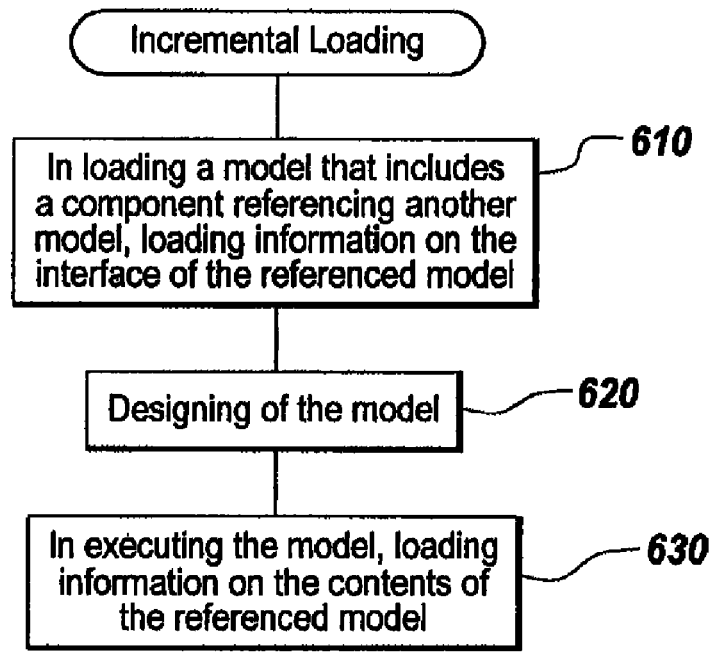
FIG. 6A is a flowchart showing the incremental loading of a model that includes a component referring to another model in the illustrative embodiment of the present invention.

Therefore, the illustrative embodiment of the present invention provides an incremental loading of the model 310 by loading only the interface information of the referenced model 320 at the time of loading the model 310. In a same manner, when loading the model 320, only the interface information of the referenced model 330 is loaded. Although the illustrative embodiment of the present invention is described below with reference to FIG. 3, one of skill in the art will appreciate that the illustrative embodiment of the present invention may be implemented with reference to FIGS. 4A and 4B. FIG. 6A is a flowchart showing the incremental loading of a model that includes a component referring to another model in the illustrative embodiment of the present invention. The referenced models 320 and 330 contain information on the interfaces of the referenced models 320 and 330 as well as information on the contents of the referenced models 320 and 330. The interface information of the referenced models 320 and 330 is provided separately from the content information of the referenced models 320 and 330. The interface information on the referenced models 320 and 330 is provided when loading parent models 310 and 320 (step 610). The parent models 310 and 320 are loaded in memory without loading the content information of the referenced models 320 and 330. The interface information of the referenced models 320 and 330 is used in the design stage of the block diagram of the models 310 and 320 (step 620). Content information of the referenced models 320 and 330 may be loaded when it is requested by users, for example, by clicking "Edit Model' and 'Open Model' buttons 343 and 344 in the user interface 430 (step 630). The content information of the referenced models 320 and 330 may also be loaded when the parent models 310 and 320 are executed/simulated.

The content information of the referenced models 320 and 330 may be provided in a binary code format when simulating or executing the model 310. The content information of the referenced models 320 and 330 is linked with the code for other components of the model 310 in order for the model 310 to be executed. The content information of the models 320 and 330 includes the designs and algorithms embodied in the referenced models 320 and 330 that are very valuable assets to those who, for example, provide software tools for the modeling environments 100. By providing the content information of the referenced models 320 and 330 in an illegible format, such as a binary format and an encrypted format, uses cannot obtain the content information of the referenced models 320 and 330. Therefore, the intellectual properties of the referenced model, such as the designs and algorithms of the referenced models 320 and 330, are protected from being disclosed to the users.

To provide a flexible modeling environment, the illustrative embodiment of the present invention supports blocks that can adapt to the context in which they are used. For example, the gain block 332 that connects to a one-dimensional input signal, executes a scalar multiplication and produces a one-dimensional output signal. However, if the gain block 332 is connected to a two-dimensional signal, it executes an element-wise multiplication on the input vector and it produces a two-dimensional output signal. Similarly, if the input is a signal with a 1 [s] sample rate, the gain block 332 produces an output signal with a 1 [s] sample rate, whereas as 2 [s] sample rate of the input signal results in a 2 [s] sample rate of the output signal.

The characteristics of blocks that depend on the context in which they are used have to be determined in a compilation process before the model can be executed. During the compilation process, known properties are used to determine the characteristics of each of the blocks that still have to be determined. For example, if the gain block 312 is connected to a constant block 311 that produces a two-dimensional output, this knowledge of the signal that connects the constant block 311 and the gain block 312 is used to set the gain block output to be two-dimensional as well and to use the element-wise multiplication for the gain block 312.

When a change to the model is made, the model is incrementally recompiled to determine the characteristics of blocks that need to be re-driven. Since on many occasions the change to the model may only affect a small number of connected blocks, the incremental approach is an inefficient way especially for large models. Once a characteristic of a block is re-derived after a model change that equals its property before the model change, this block has no further effects that need to be accounted for.

Model reference is a preferred embodiment to limit this compilation effect. The encapsulation that model reference provides forms a natural boundary for the effect that model changes may have. Certain changes within a referenced model cannot change the property of its interface characteristics, and, therefore, they do not need to be re-derived for any blocks connected to the referenced model.

Figure 6B:
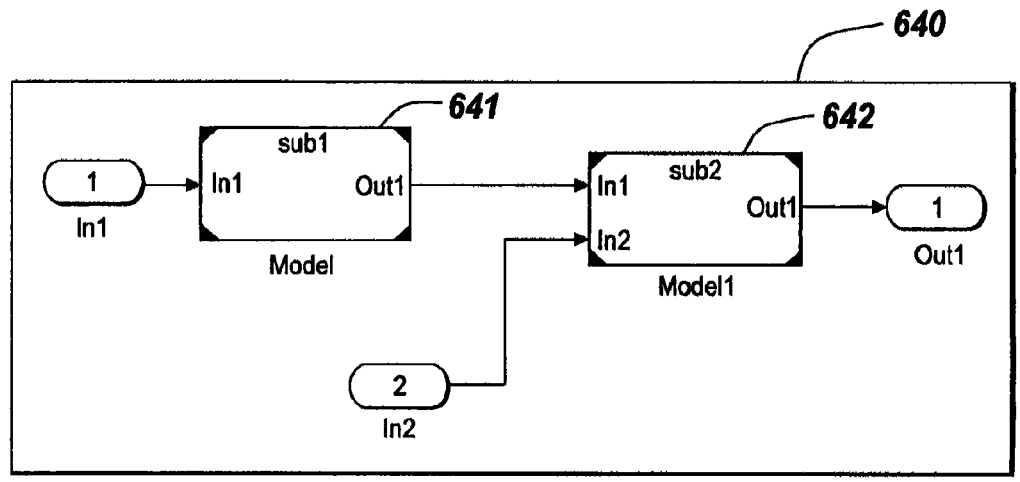
FIGS. 6B-6D show an example of a parent model and sub-models referenced by the parent model.
Figure 6C:
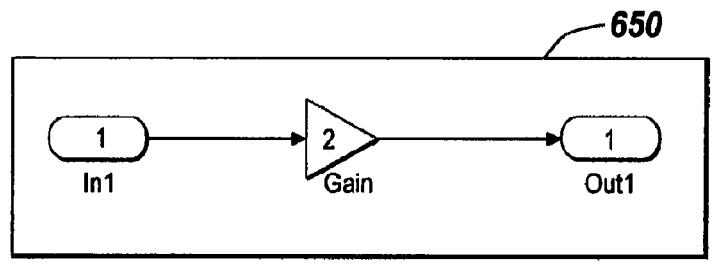
Figure 6D:
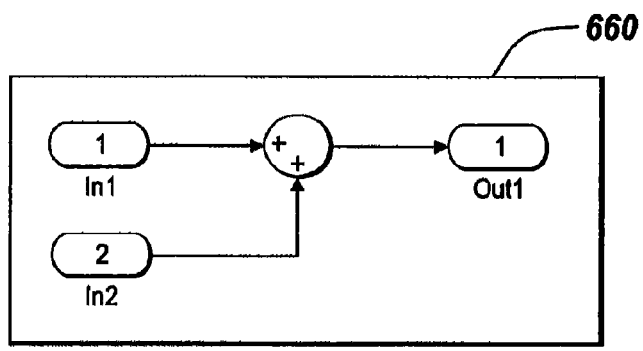
Figure 6E:
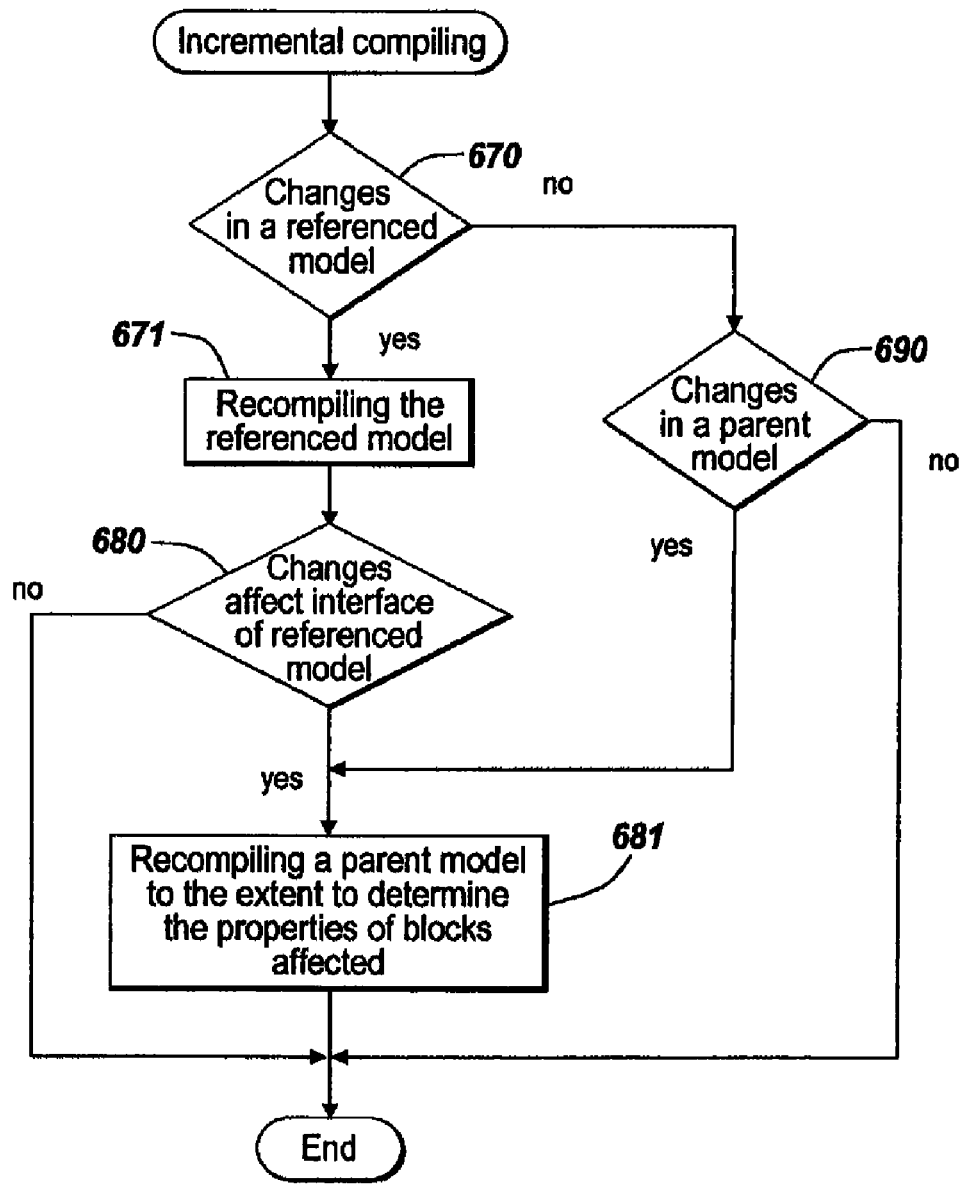
FIG. 6E is a flowchart showing the incremental recompilation of a model that includes a component referring to another model in the illustrative embodiment of the present invention.

FIG. 6E is a flowchart showing an incremental recompilation of a model in the illustrative embodiment of the present invention. The model may include at least a component referring to another model. When there are changes in a referenced model (step 670), the referenced model is recompiled to determine properties of blocks in the referenced model (step 671). The referenced model may be compiled to an extent that determines properties of blocks in the referenced model that are affected by the changes in the referenced model. It is determined whether the interface of the referenced model is affected by the changes in the referenced model (step 690). When the interface of the referenced model is not affected by the changes in the referenced model, the parent model is not recompiled. When the interface of the referenced model is affected by the changes, the parent model is recompiled to the extent that determines the properties of the blocks in the parent model that are affected by the changes (step 681). The step 681 may also be performed when there are changes in the parent model not in the referenced model (step 690).

The illustrative embodiment of the present invention also provides incremental code generation. If changes are made in the referenced models 320 and 330, and the changes in the referenced models 320 and 330 do not affect the parent model 310, code for the referenced models 320 and 330 is regenerated to reflect the changes in the referenced models 320 and 330. Code for other components of the model 310, however, does not need to be regenerated because the changes in the referenced models 320 and 330 do not affect other components of the parent model 310. The incremental code generation will be described below with reference to an illustrative code.

An illustrative code for the model 330 is provided as follows:

```
void mr_l2(const real_T *rtu_0, real_T *rty_0)
{
/* Opaque: '<Root>/Opaque' */
/* Gain: '<Root>/Gain' */
(*rty_0)=5.0*(*rtu_0);
}
```

If the parameter value of the Gain block 332 is changed, the propagation of the change is limited within the model 330 and only the line (*rty_0)=5.0*(*rtu_0); is affected in the code for the model 330. Therefore, code for the model 330 needs to be regenerated to reflect the change of the parameter value of the Gain block 332. The function call void mr_l2 (const real_T *rtu_0, real_T *rty_0), however, does not change, and so the code for the higher level models 310 and 320 in the hierarchy of the model 310 does not need to be regenerated. The incremental code generation of the illustrative embodiment of the present invention improves compilation time for compiling the model 310.

Similarly, if the parameter value of the Gain block 312 in the parent model is changed, the propagation of the change is limited within the model 310. If the model is used in accelerated model, only the line localB→Gain=1.0*2.0; in the compiled code
void mr_l0(rtB_mr_l0 *localB, rtDW_mr_l0 *localDW)
{
localB→Gain=1.0*2.0;
mr_l1(&localB→Gain, &localB→Model, &(localDW→Model_DWORK1.rtb));
}
is affected. Therefore, code for the model 310 has to be regenerated to reflect the change of the parameter value of the Gain block 312. The function call mr_l1(&localB→Gain, &localB→Model, &(localDW→Model_DWORK1.rtb));, however, does not change, and so the code for the lower level models 320 and 333 in the hierarchy of the model 310 does not need to be regenerated. The incremental code generation of the illustrative embodiment of the present invention improves compilation time for compiling the model 310.

The skilled practitioner in the art recognizes that the incremental code generation applies to other model processing tasks such as model loading and model compilation, either as comprehensive or sub-tasks, as well.

Although in the illustrative code described above, changes in the referenced model do not affect its interface and code for the parent model does not need to be regenerated, the incremental code generation may also be provided when changes in a referenced model affect its interface. FIGS. 6B-6D shows another example in which changes in a referenced model affect its interface. FIG. 6B is an example of a parent model 640 that includes Model blocks 641 and 642. The Model blocks 641 and 642 refer to models 650 and 660 depicted in FIGS. 6C and 6D, respectively. Assuming that changes in the referenced model 650 affect the interface of the model 650, the parent model 640 may need to be rebuilt to include the changes in the interface of the model 650. In rebuilding the parent model 650, the other referenced model 660 need not be rebuilt because the changes in the referenced model 650 do not affect the other referenced model 660.

Figure 7:
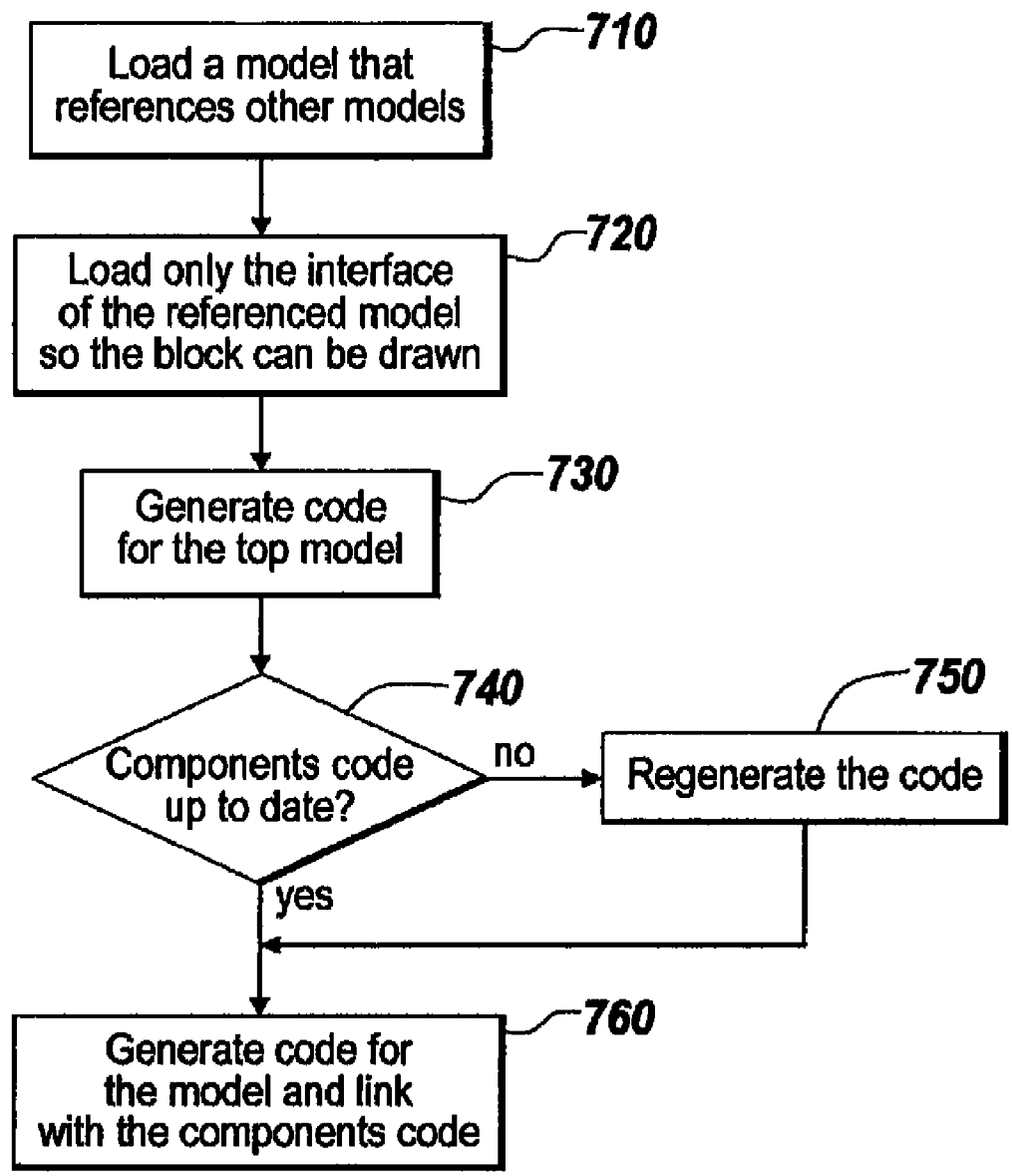
FIG. 7 is a flowchart showing the code generation of a model in the illustrative embodiment of the present invention.

FIG. 7 is a flowchart showing the code generation of a model in the illustrative embodiment of the present invention. The model may include at least a component that references another model. First, the block diagram of the model is loaded in the memory of the electronic device 200 (step 710). In loading the block diagram of the model, only the information on the interface of the referenced model is loaded so that the information on the interface of the referenced model can be used to complete the block diagram of the model (step 720). If the loading of the model is finished, code for the model is generated (step 730) using the block diagram tool 120 in the modeling environment 100. Next, code for the components of the model is checked to determine whether the code for each component of the model is updated (step 740). When a change is made in the referenced model and code for the referenced model is not updated, code for the referenced model is regenerated and rebuilt (step 750). A unique identifier of the referenced model representing the referenced model is needed to determine whether there is a change in the referenced model. The date stamp of the referenced model may be used as the unique identifier of the referenced model. The date stamp of the referenced model may be compared with the date on the generated code to determine whether the code for the referenced model is updated. If the date of the referenced model is different from the date on the generated code, code for the referenced model is regenerated. An alternative embodiment may utilize as the unique identifier of the referenced model the checksum of the referenced model that combines all the relevant attributes of the referenced model into a single unique number, such as an MD5 checksum. This MD5 checksum of the referenced model is a 128-bit number that is mathematically derived from the referenced model. Any change in the referenced model results in a change in the MD5 checksum of the referenced model. In a checksum based implementation, the interface and content information of the referenced model can be evaluated separately. So changes in the content of the referenced model that do not affect the interface of the referenced model do not affect the generated code for other components of the model, and, therefore, the regeneration and recompilation of other components of the model are not required. Finally, the code for the model generated in step 730 is linked with the code for the components of the model (step 760).

Figure 8:
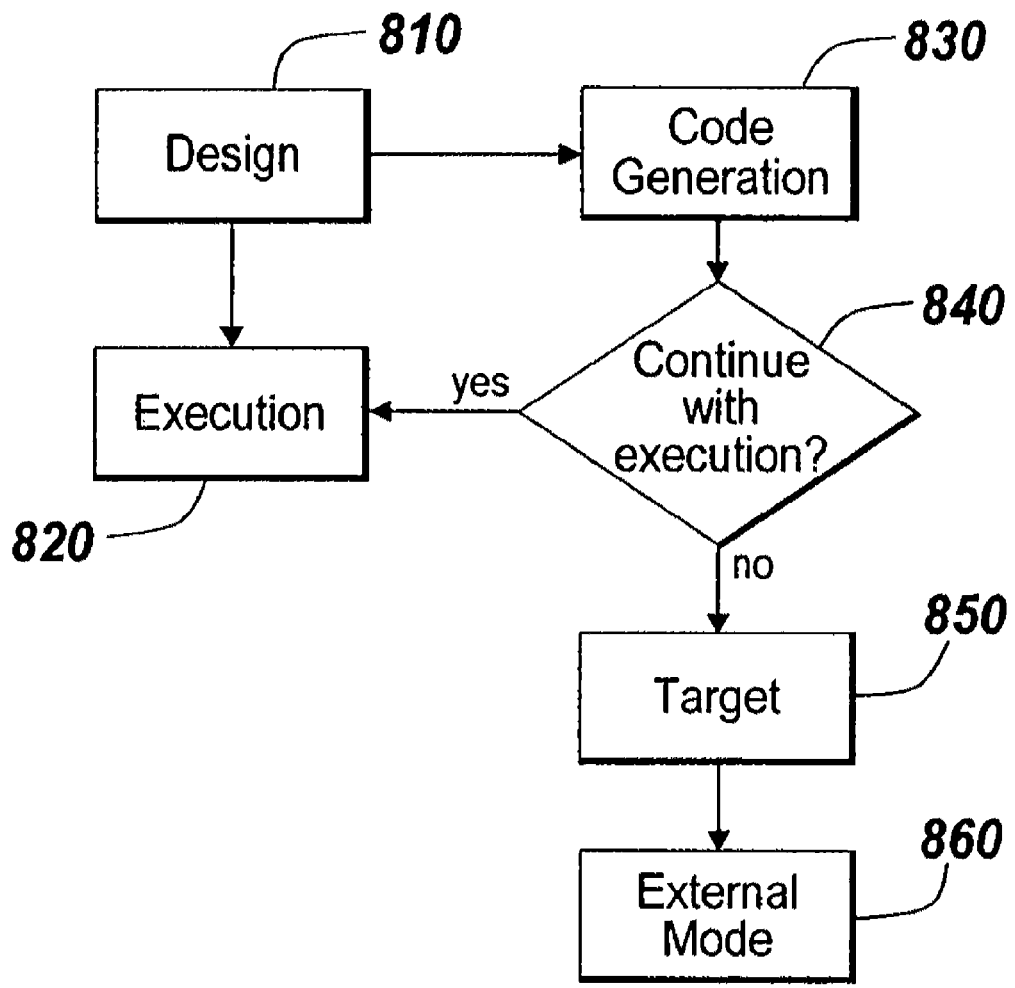
FIG. 8 shows execution modes for executing models that may include an interpretive execution mode and an accelerated execution mode.

The code generation of the illustrative embodiment of the present invention may be applied to the execution of models. FIG. 8 shows execution modes for executing models that may include an interpretive execution mode and an accelerated execution mode. The execution 820 of models repeatedly evaluates the components of the models to determine the behavior of the models after the design 810 of the models. In an interpretive execution mode, an execution engine calls each of the components of the model to provide the behavior of the component in response to a given input. The interpretive execution mode does not require a stage to compile the model into a binary representation. Therefore, the initialization and startup phase is much shorter in the interpretive execution mode, which allows a quick experiment with model changes. In the accelerated execution mode, the components of models are grouped together in a pre-compiled sequence that includes the code generation 830 of the components and the compilation of the generated code. The compiled code can be executed without intermediate interaction with the execution engine. The accelerated execution mode requires a more extensive startup phase to perform the compilation of the components into a binary form. Once the compilation is performed, the execution of the models proceeds much more quickly since the evaluation of each of the components does not have to be individually triggered time and time again. The illustrative embodiment of the present invention provides a mixed execution mode in which some of the components are executed in an interpretive execution mode and some of the components are executed in an accelerated mode. In particular, the illustrative embodiment of the present invention enables the users to easily set up the mixed execution mode by selecting components that is to be executed in the accelerated execution mode.

If code is generated, a decision 840 is made whether to continue the execution. If the decision is made to continue the execution, the model is executed. If the execution is not continued, the code may be delivered to a target 850 and executed in an external mode 860. There are several forms of target code execution known to those skilled in the art such as Rapid Prototyping, Embedded System Deployment, and Hardware-in-the-Loop which execute a model or portions of a model via the generated code on a Real-Time System target.

One aspect of deploying (executing) the generated code on a target is the notion of "external mode." External mode refers to a system where Simulink acts as a monitor and debugger of the generated code running in real-time on a target. In External Mode, users can change parameters and view signals via standard Simulink elements.

Figure 9:
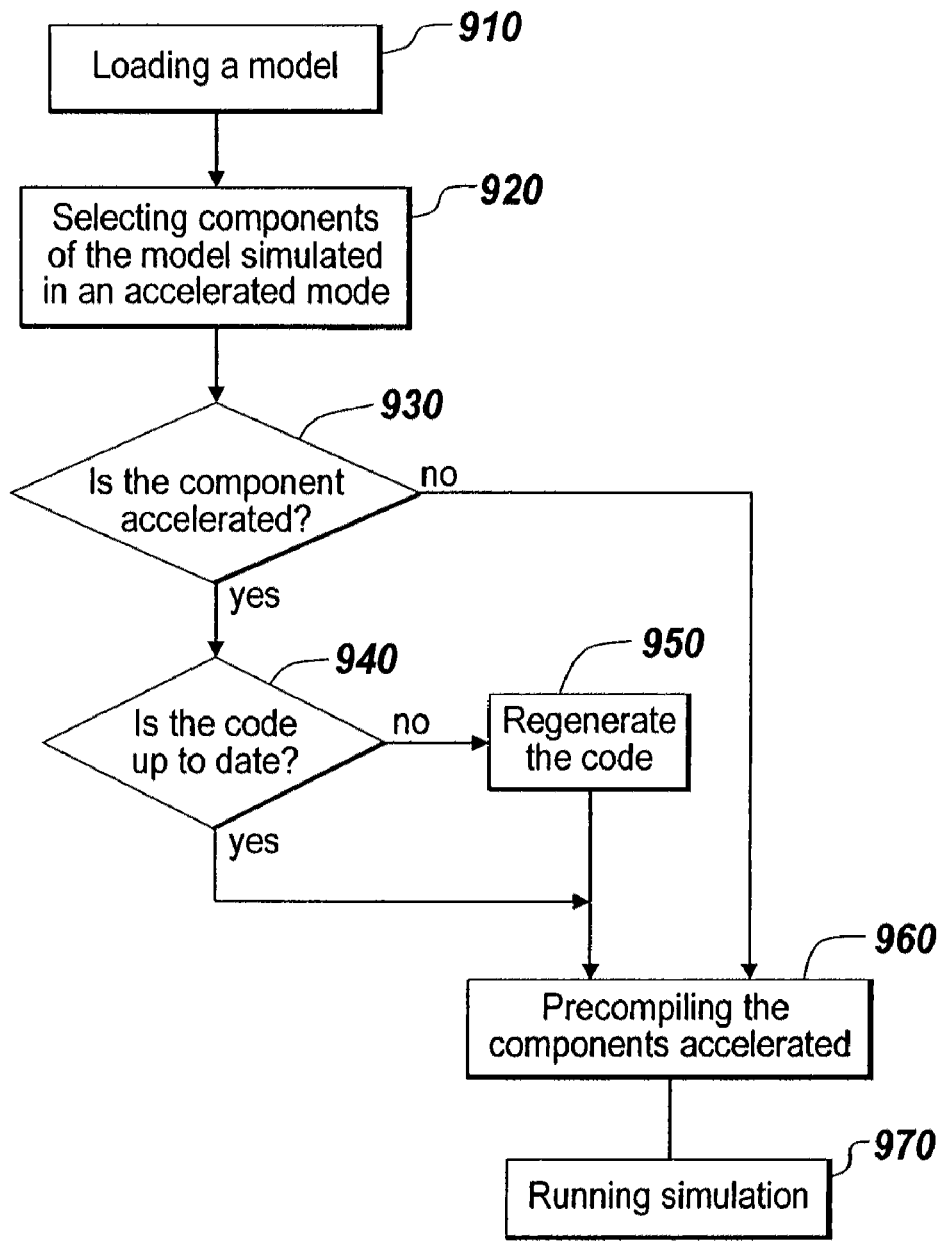
FIG. 9 shows the code generation in connection with the execution of models in the illustrative embodiment of the present invention.

FIG. 9 shows the operation of the code generation in connection with the execution of models in the illustrative embodiment of the present invention. First, a block diagram of a model is loaded in memory (step 910). The model may include at least a component that references another model. In loading the model, only the information on the interface of the referenced model is loaded so that the interface of the referenced model is used for the block diagram of the model. If the loading of the model is finished, users can select components of the model that are to be executed in accelerated execution mode (step 920). The rest of the components may be executed in the interpretive execution mode, a default execution mode. With respect to the selected components that are to be executed in an accelerated mode (step 930), code for the selected components of the model is checked to determine whether the code for the components of the model is updated (step 940). If the code for the selected components of the model is not updated, code for the selected components of the model is regenerated (step 950). Code for the selected components is precompiled (step 960) before the execution starts (step 970). The compiled code for the selected components can be executed independently of the execution engine for the interpretive execution.

In summary, the illustrative embodiment of the present invention provides models that include components referring to other models. The information on the interface of the referenced models is provided to the models separately from the information on the content of the referenced models. The illustrative embodiment of the present invention provides the content information of the referenced models in an illegible format, such as an encrypted format and a binary format that can be executed in modeling environments. Users cannot read the content information of the referenced models so that the content information of the referenced models, such as the designs and algorithms of the referenced models, is protected from being disclosed to the users. In addition, the referenced models are encapsulated to a degree that certain changes in the referenced models do not affect other components of the parent models. Therefore, if changes are made in the referenced models, only the referenced models need to be compiled and code for the referenced model is regenerated to reflect the changes. However, code for other components of the parent models need not be regenerated. The illustrative embodiment of the present invention also provides a simple way to set up a mixed execution mode of a model. The illustrative embodiment of the present invention enables users to selected component of the model that are to be executed in an accelerated execution mode. Code for the selected components is precompiled before the execution begins.

It will thus be seen that the invention attains the objectives stated in the previous description. Since certain changes may be made without departing from the scope of the present invention, it is intended that all matter contained in the above description or shown in the accompanying drawings be interpretive as illustrative and not in a literal sense. For example, the illustrative embodiment of the present invention may be practiced in any modeling environment that provides the ability to partition objects, for example, block diagram models. Practitioners of the art will realize that the sequence of steps and architectures depicted in the figures may be altered without departing from the scope of the present invention and that the illustrations contained herein are singular examples of a multitude of possible depictions of the present invention.

We claim:

1. In an electronic device that provides object-oriented environments, a method for executing a model having an interface and content and including components, wherein one of the components references a second model, the method comprising:
   generating code for the model, the model associated with information relating to the interface and information relating to content;
   selecting a first set of the components of the model executed in a first execution mode;
   identifying a second set of the components of the model executed in a second execution mode;
   determining whether code for the first set of components is up to date, where the determining:
   is based on the first set of components,
   determines that the code for the first set of components is not up to date when the information relating to the interface of the model has been changed, and
   determines that the code for the first set of components is up to date when the information relating to the content of the model is changed without changing the information relating to the interface of the model;
   regenerating code for only the first set of components when the code for the first set of components is not up to date; and
   executing the model in a mixed execution mode, the mixed execution mode including:
   executing the first set of the components in the first execution mode, and
   executing the second set of the components in the second execution mode.

2. The method of claim 1 wherein the first execution mode includes an accelerated execution mode.

3. The method of claim 1 wherein the second execution mode includes an interpretive execution mode.

4. The method of claim 1 wherein the first execution mode executes with a fixed-sized step while the second execution mode executes with a variable-sized step.

5. The method of claim 2 wherein the second object is included in the first set of the components and executed in the accelerated execution mode.

6. The method of claim 3 wherein the second model is included in the second set of the components and executed in the interpretive execution mode.

7. The method of claim 2 wherein the first set of components is precompiled before executing the model.

8. A non-transitory medium holding instructions executable in an electronic device that provides object-oriented environments, comprising:
   generating code for a model, the model having an interface and content;
   selecting a first set of the components of the model that is executed in an accelerated execution mode;
   selecting a second set of the components of the model that is executed in an interpretive execution mode;
   determining whether code for the first set of components is up to date, where the determining:
   is based on the first set of components,
   determines that the code for the first set of components is not up to date when the information relating to the interface of the model has been changed, and
   determines that the code for the first set of components is up to date when the information relating to the content of the model is changed without changing the information relating to the interface of the model;

regenerating code for only the first set of components when the code for the first set of components is not up to date; and executing the model in a mixed execution mode wherein the first set of the components is executed in the accelerated mode and the second set of the components are executed in the interpretive execution mode.

9. The medium of claim 8 wherein a second model is referenced by the model.

10. The medium of claim 8 wherein the first set of components is precompiled before executing the model.

11. The medium of claim 8 wherein the first execution mode includes an accelerated execution mode.

12. The medium of claim 8 wherein the second execution mode includes an interpretive execution mode.

13. The medium of claim 8 wherein the first execution mode executes in a fixed step while the second execution mode executes in a variable step.

14. The medium of claim 9 wherein the second model is included in the first set of the components and executed in the accelerated execution mode.

15. The medium of claim 9 wherein the second model is included in the second set of the components and executed in the interpretive execution mode.

16. A system comprising:
a memory storing generated code for a model, the model having and interface and content; and
a processor for:
selecting a first set of the components of the model that is executed in an accelerated execution mode;
selecting a second set of the components of the model that is executed in an interpretive execution mode;
determining whether code for the first set of components is up to date, where the determining:
is based on the first set of components,
determines that the code for the first set of components is not up to date when the information relating to the interface of the model has been changed, and
determines that the code for the first set of components is up to date when the information relating to the content of the model is changed without changing the information relating to the interface of the model;
regenerating code for only the first set of components when the code for the first set of components is not up to date; and
executing the model in a mixed execution mode wherein the first set of the components is executed in the accelerated mode and the second set of the components are executed in the interpretive execution mode.

17. The system of claim 16, wherein a second model is referenced by the model.

18. The system of claim 16, wherein the first set of components is precompiled before executing the model.

19. The system of claim 16, wherein the first execution mode includes an accelerated execution mode.

20. The system of claim 16, wherein the second execution mode includes an interpretive execution mode.

* * * * *

UNITED STATES PATENT AND TRADEMARK OFFICE
CERTIFICATE OF CORRECTION

| | | |
|---|---|---|
| PATENT NO. | : 8,150,673 B1 | Page 1 of 1 |
| APPLICATION NO. | : 11/825371 | |
| DATED | : April 3, 2012 | |
| INVENTOR(S) | : Michael David Tocci et al. | |

It is certified that error appears in the above-identified patent and that said Letters Patent is hereby corrected as shown below:

On the printed patent, in the specification, column 10, line 66, "rest of the model file may includes thousands" should be --rest of the model file may include thousands--

Signed and Sealed this
Twenty-sixth Day of June, 2012

David J. Kappos
*Director of the United States Patent and Trademark Office*